United States Patent [19]

Bosco

[11] 4,310,378
[45] Jan. 12, 1982

[54] TAPE SPLICING MACHINE, IN PARTICULAR FOR MAGNETIC TAPES FOR LOADING INTO CASSETTES

[75] Inventor: Angelo Bosco, San Donato Milanese, Italy

[73] Assignee: AEG-Telefunken Societa Italiana per Azioni, Milan, Italy

[21] Appl. No.: 128,311

[22] Filed: Mar. 7, 1980

[30] Foreign Application Priority Data

Mar. 12, 1979 [IT] Italy .............................. 20910 A/79

[51] Int. Cl.³ .................. B31F 5/06; B65H 69/06
[52] U.S. Cl. ...................... 156/506; 156/304.3; 156/518; 242/58.1
[58] Field of Search .................. 156/304.3, 505, 506, 156/518, 520, 497, 517, 519; 242/58.1, 58.5

[56] References Cited

U.S. PATENT DOCUMENTS

| | | | |
|---|---|---|---|
| 3,753,835 | 8/1973 | King | 156/506 |
| 3,825,461 | 7/1974 | Gorman | 156/506 |
| 3,880,699 | 4/1975 | Nishimoto | 156/505 |
| 3,929,552 | 12/1975 | Bettenhausen et al. | 156/518 |
| 4,181,558 | 1/1980 | Neubronner | 156/506 |
| 4,230,520 | 10/1980 | Morgan | 156/505 |

*Primary Examiner*—Michael G. Wityshyn
*Attorney, Agent, or Firm*—Cushman, Darby & Cushman

[57] ABSTRACT

The tape splicing machine comprises feed means for intermittently feeding adhesive tape from a continuous roll to a mobile head provided with sucking and blowing means and with cutting means. Said feed means comprise a grooved wheel partly wrapped by the tape and a support and guide element provided with sucking and blowing means. Said element is moved periodically to and from the head so as to transfer subsequent portions of the tape from the grooved wheel to the head.

4 Claims, 9 Drawing Figures

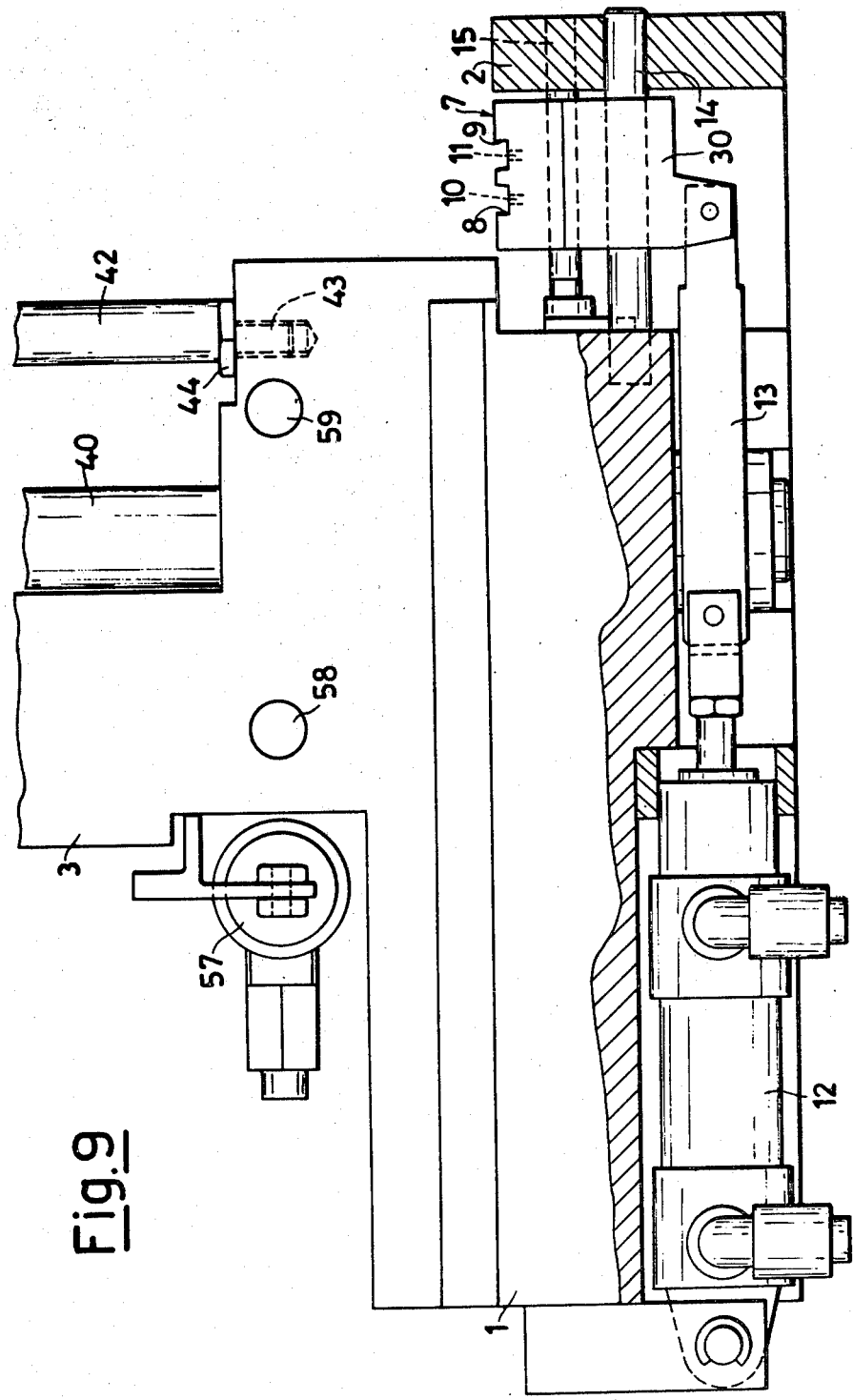

TAPE SPLICING MACHINE, IN PARTICULAR FOR MAGNETIC TAPES FOR LOADING INTO CASSETTES

This invention relates to a tape splicing machine, in particular for magnetic tapes for loading into cassettes.

This type of splicing is carried out by suitable machines which place short lengths of adhesive tape over the abutting ends of two tape portions disposed one following the other.

In particular, there is the machine described in Italian Pat. No. 918,474 of the present applicant, and there are further machines of other manufacturers, the basic idea of which is to intermittently feed the adhesive tape engaged with suitable wheels of teflon or other poorly adhesive material to a position in proximity to an alternately sucking and blowing head, which firstly separates the continuous arriving tape and then presses individual pieces of adhesive splicing tape over the tape portions to be spliced.

The common problem of these splicing machines, and in particular of that of said Italian Pat. No. 918,474, is that as the portion of adhesive tape lying between the wheels and head is without a support or guide, it tends to assume an incorrect position, the result of which is often inexact positioning of the adhesive tape over the two tapes to be spliced.

The object of the present invention is therefore to provide a splicing machine in which undesirable movement and misalignment of the adhesive tape before its engagement with the sucking and blowing head is prevented.

According to the invention this object is attained by a splicing machine, comprising means for intermittently feeding adhesive tape in a continuous roll to an alternately sucking and blowing mobile head provided with cutting means for separating individual pieces of adhesive tape from said continuous roll, wherein said adhesive tape feed means comprise a grooved wheel which is partly wrapped by the adhesive tape, and an alternately sucking and blowing mobile support and guide element which is able to engage and support the portion of adhesive tape situated between the grooved wheel and the head, and is controlled such that it makes periodic movements towards the head in order to convey said portion of adhesive tape into a suitable position for its engagement by said head.

It is apparent that the support provided by the mobile support and guide element to the portion of adhesive tape situated between the grooved wheel and head prevents undesirable displacement of the tape from its correct position, and thus ensures constant exact positioning of the piece of separated tape over the two tapes to be spliced.

The characteristics of the present invention will be more apparent from the detailed description given hereinafter by way of non-limiting example of one embodiment thereof, with reference to the accompanying drawings in which:

FIG. 9 is a section through said machine on the line IX—IX of FIGS. 1 and 8.

Figure 8:
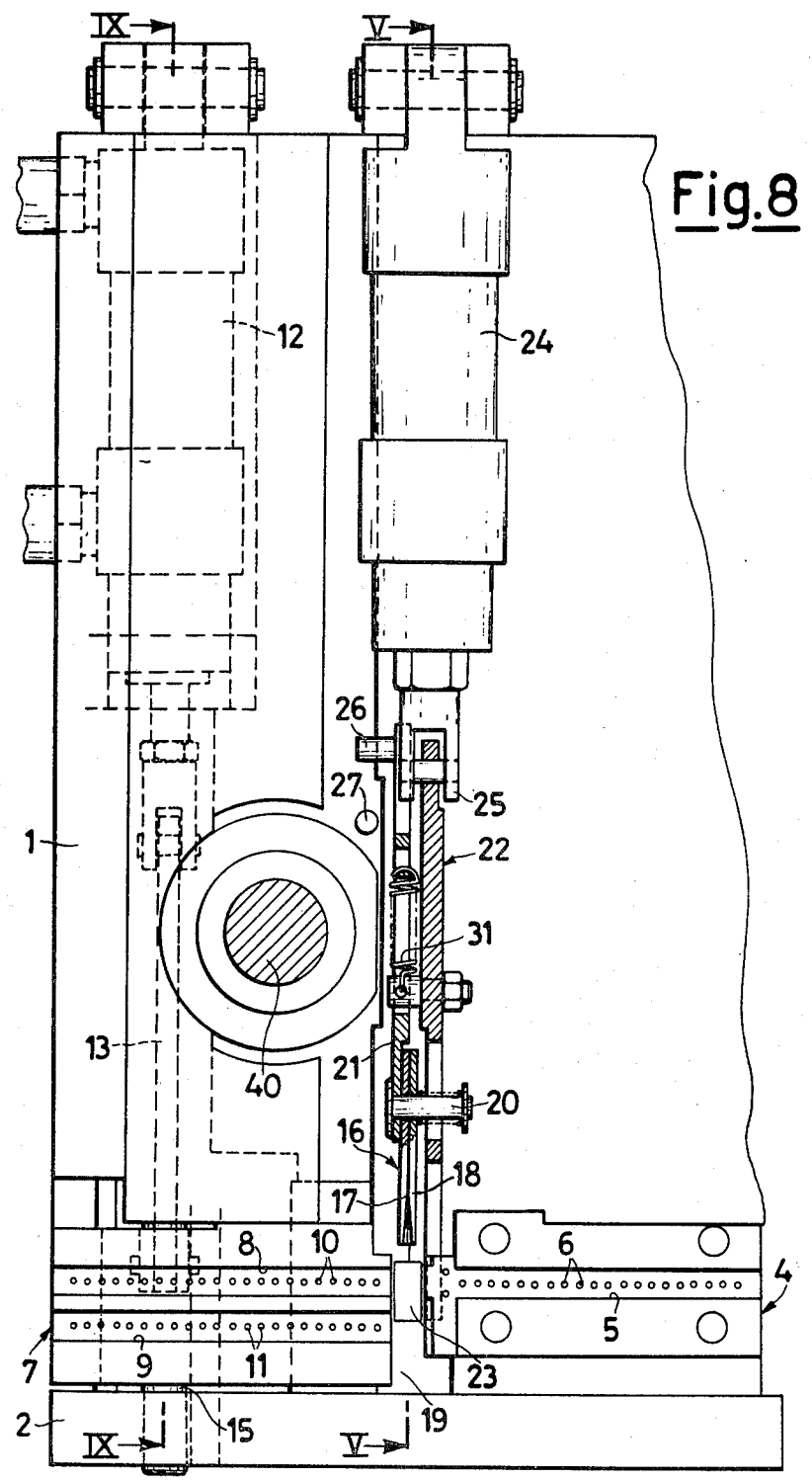
FIG. 8 is a section through said machine on the line VIII—VIII of FIG. 2.

The machine shown on the drawings comprises a base frame 1, to the front of which is fixed a plate 2 and on which a vertically extending member 3 is mounted in an adjustable manner (perpendicular to the plate 2). In an intermediate position between the plate 2 and adjustable member 3, there are disposed on one side (to the right in FIG. 8) a fixed plate 4 with a single groove 5 provided with a series of bores 6 which can be connected either to a suction source or air supply, and on the other side (to the left in FIG. 8) a mobile plate 7 with two parallel grooves 8 and 9 provided with respective series of bores 10 and 11 which can be connected either to a suction source or to an air supply. The movements of the plate 7 in a direction perpendicular to the fixed plate 2 and to the direction of extension of the grooves 5, 8 and 9, are controlled by a pneumatic cylinder 12 by way of a connection rod 13 and a bracket 30, and are guided by a pair of fixed bars 14 and 15 (FIGS. 8 and 9).

Figure 5:
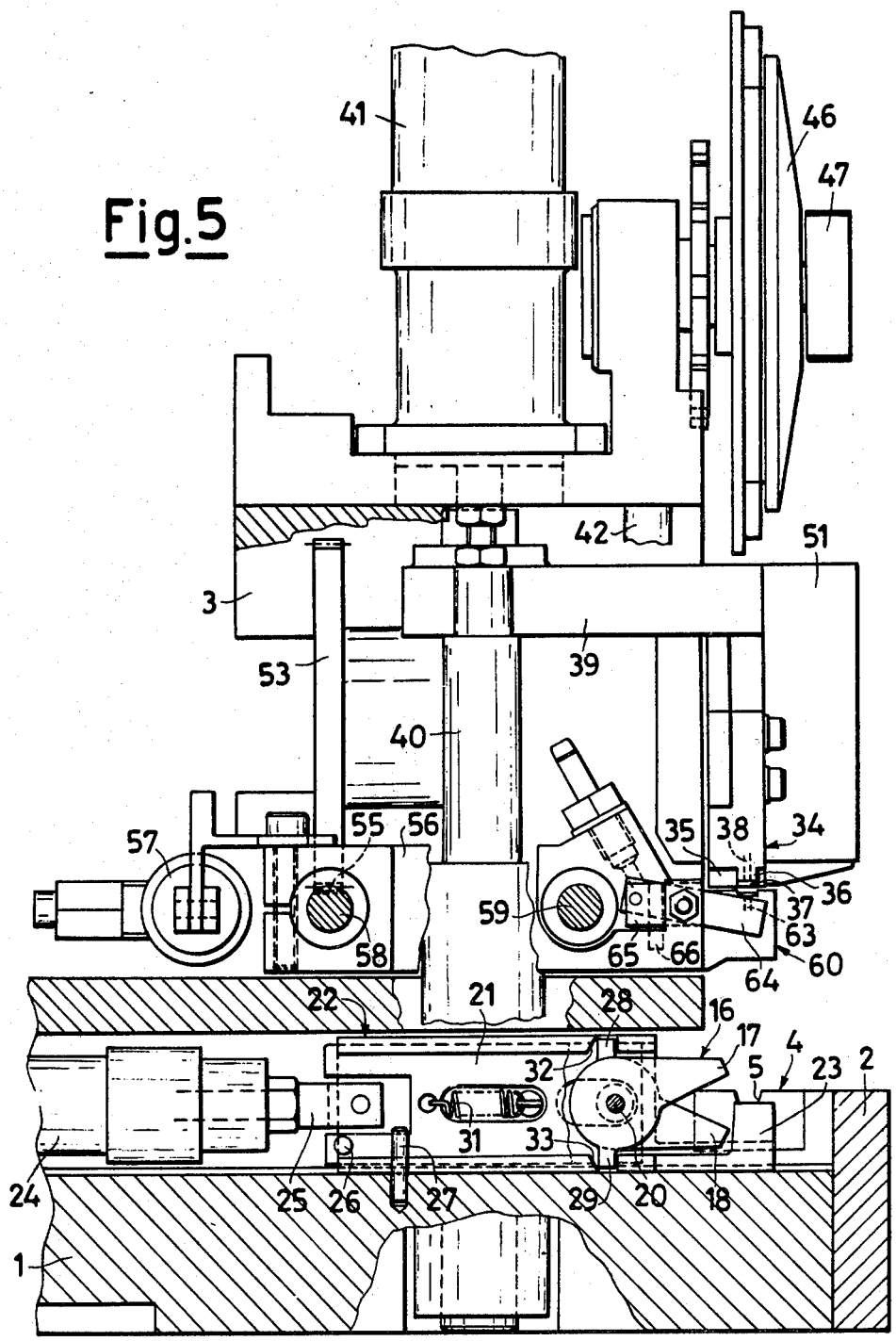
FIG. 5 is a section through said machine on the line V—V of FIGS. 1 and 8.

Between the two grooved plates 4 and 7 there is an empty space 19 (FIG.8), into which a scissor element 16 can be inserted at the appropriate moment, the scissor element being formed from two cutting levers 17 and 18 (FIG. 5) both pivoted at 20 to a plate 21 slidably inserted in a support 22 of C cross-section provided with an extension 23 disposed in front of the scissor element 16. The support 22 is slidably housed in the base frame 1, and can be moved axially from the rest position of FIGS. 5 and 8 by operating a pneumatic cylinder 24 to which it is connected by means of a fork 25. During the initial part of the advancing stroke of the support 22, the plate 21 is obliged by a spring 31 to move rigid with the support 22, thus inserting the scissor element 16 into the empty space 19 between the grooved plates 4 and 7. However, before said advancement stroke terminates, a pin 26 projecting transversely from the plate 21 encounters a fixed pin 27 which by stopping the advancement of only the plate 21, creates a relative movement between the plate and support which, because of the engagement between two fingers 28 and 29 projecting from the cutting levers 17 and 18 and corresponding notches 32 and 33 in the support 22, automatically causes the cutting rotation of the cutting levers 17 and 18.

Figure 1:
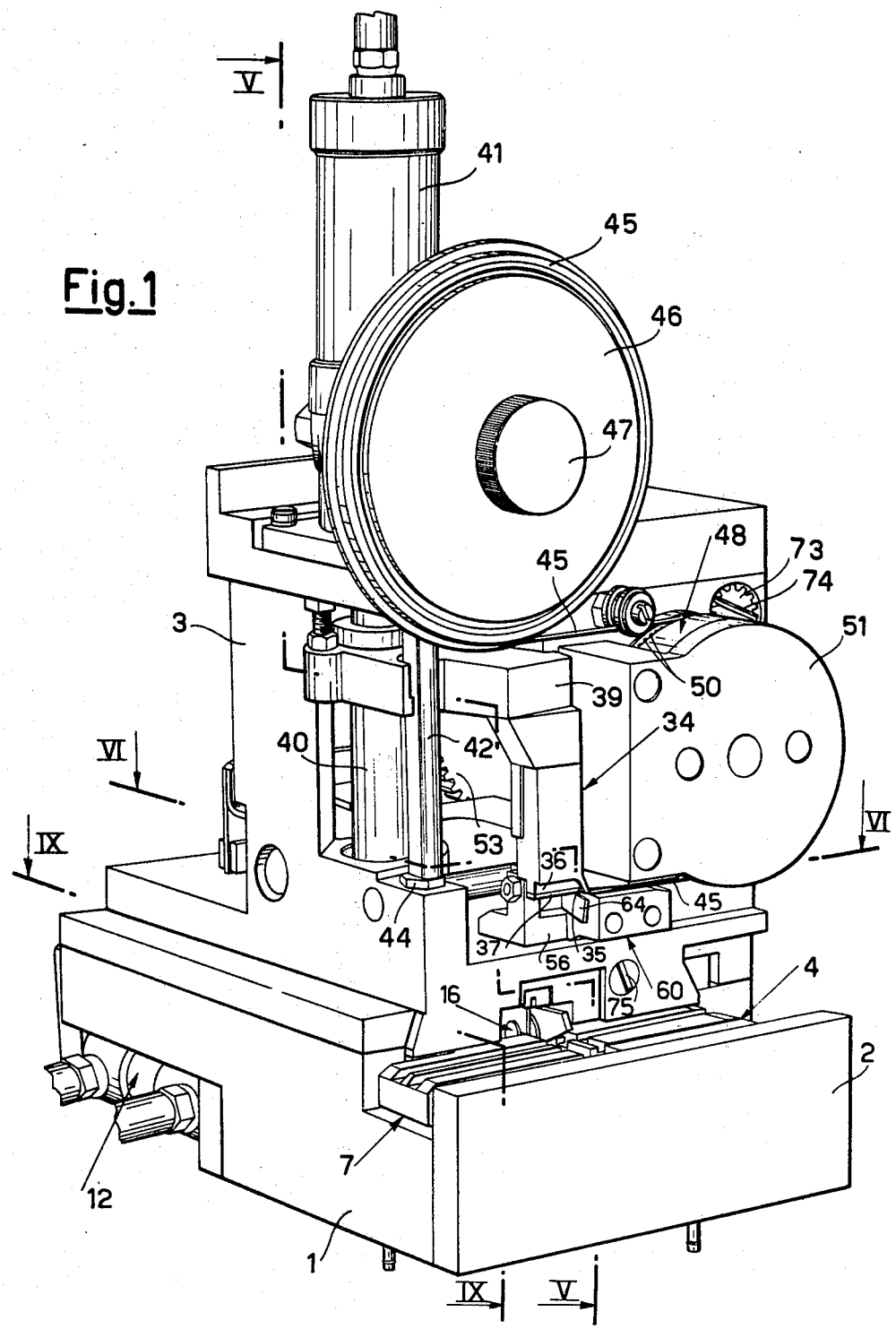
FIG. 1 is a perspective view of a splicing machine according to the invention, specifically provided for splicing portions of magnetic tape and connection tape during the loading of magnetic tape into a recording cassette.
Figure 2:
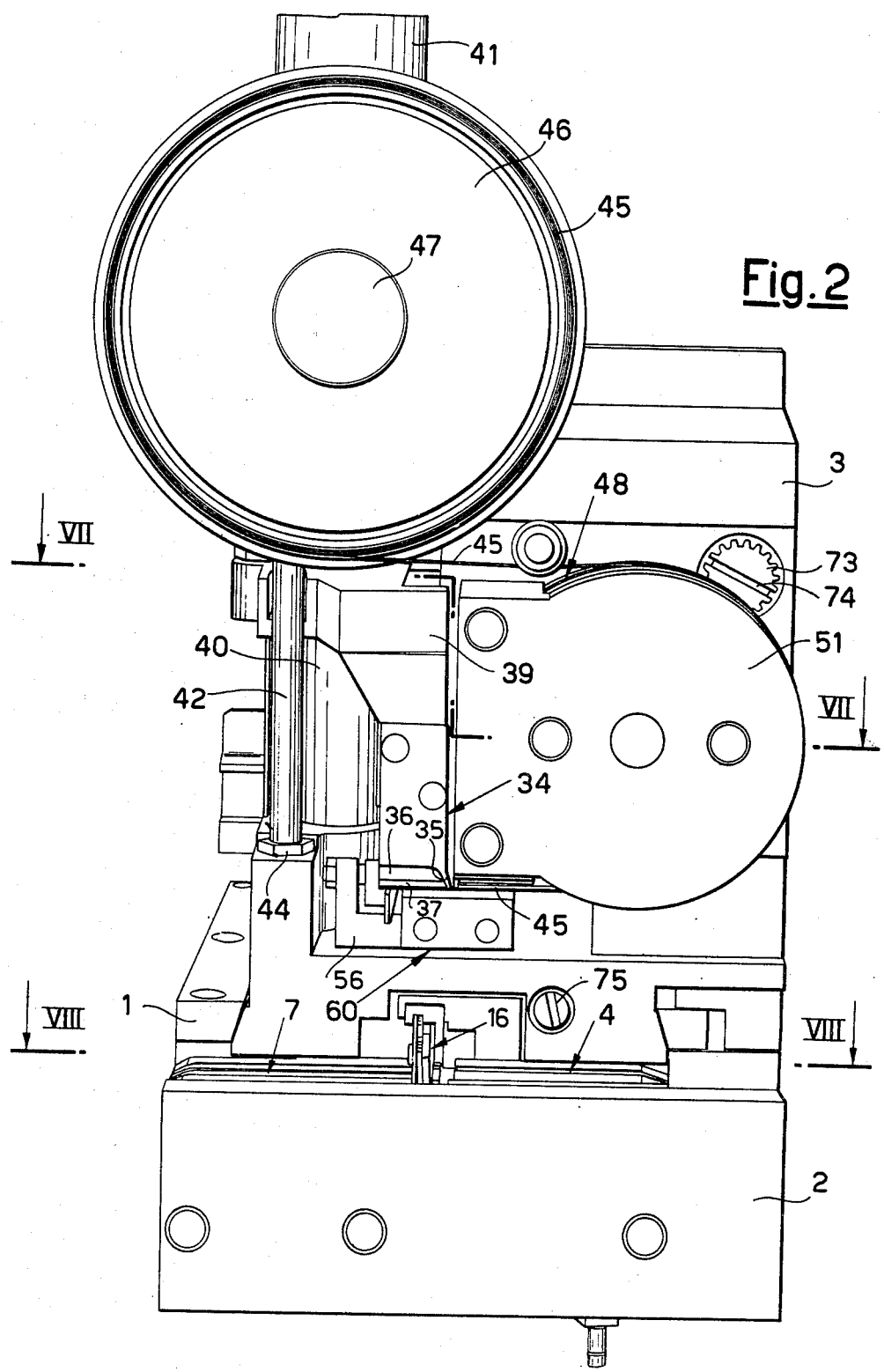
FIG. 2 is a front view of said machine during a first operating stage.
Figure 3:
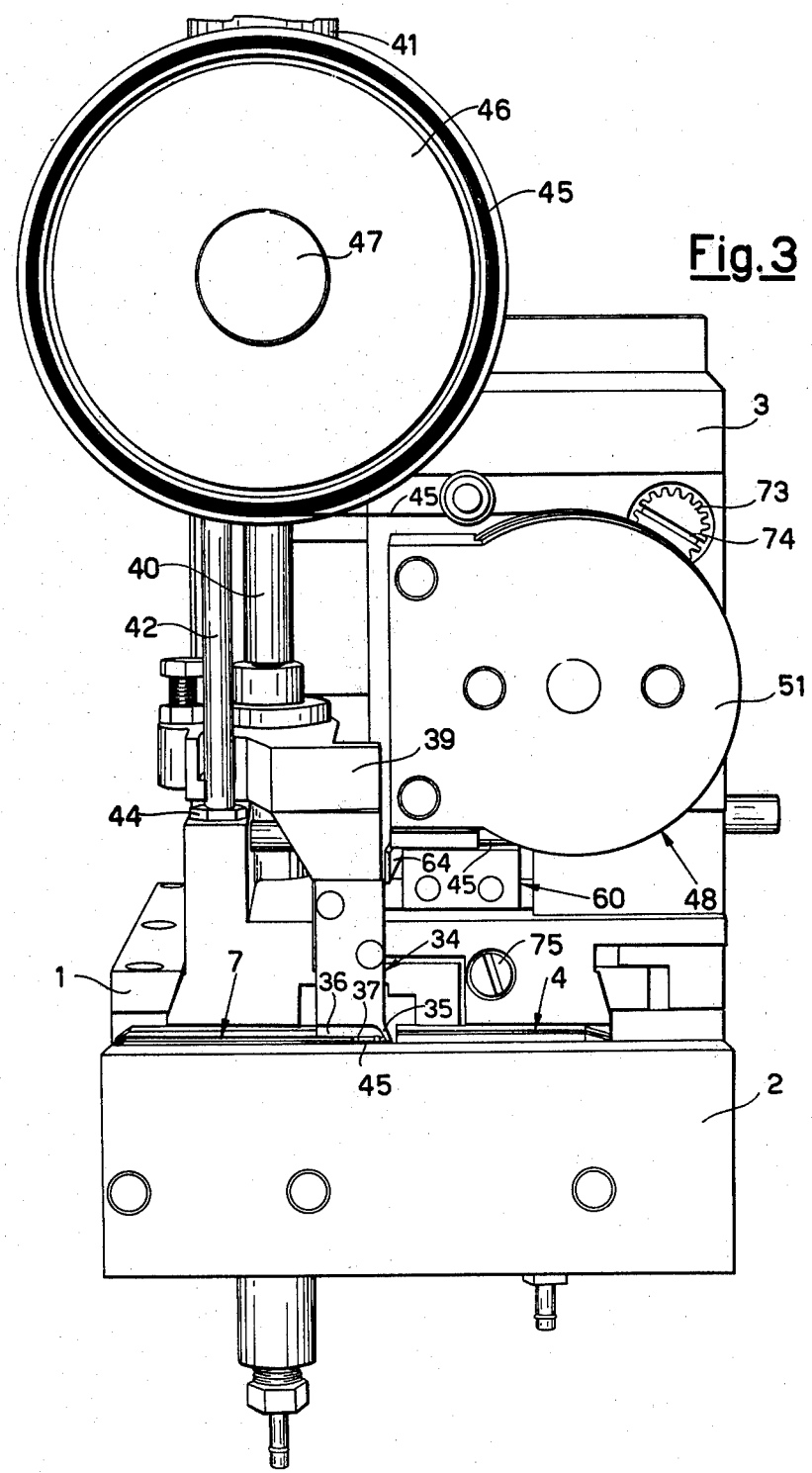
FIG. 3 is a front view of said machine during a second operating stage.

The vertically extending adjustable member 3 supports the actual splicing assembly, which comprises a splicing head 34 vertically mobile between the rest position of FIGS. 1 and 2 and the working position of FIG. 3. As can be seen from FIGS. 1 to 6, the splicing head 34 is provided with a lateral cutting edge 35 and a narrow lower appendix 36 provided with a layer of rubber 37, the rubber and appendix being traversed by a series of small bores 38 which can be connected either to a suction source or an air supply. The head 34 is rigid with a lever support 39, which is pivoted (FIG. 7) on an axially slidable pin 40 which constitutes an extension of the piston rod of a pneumatic cylinder 41 mounted on the member 3. The vertical movement of the lever 39 and consequently of the head 34 is guided by the engagement between the lever and a rod of approximately elliptical cross-section 42, which is pivoted adjustably on an eccentric axis defined by a cylindrical bush 43 provided with a hexagonal head 44 (FIGS. 1 to 3 and 6 to 7). By adjusting the angular position of the rod 42, the angular position of the lever support 39 can be adjusted relative to its pivot 40, so as to correspondingly adjust the position of the head 34 relative to the direction of extension of the plates 4 and 7.

Figure 4:
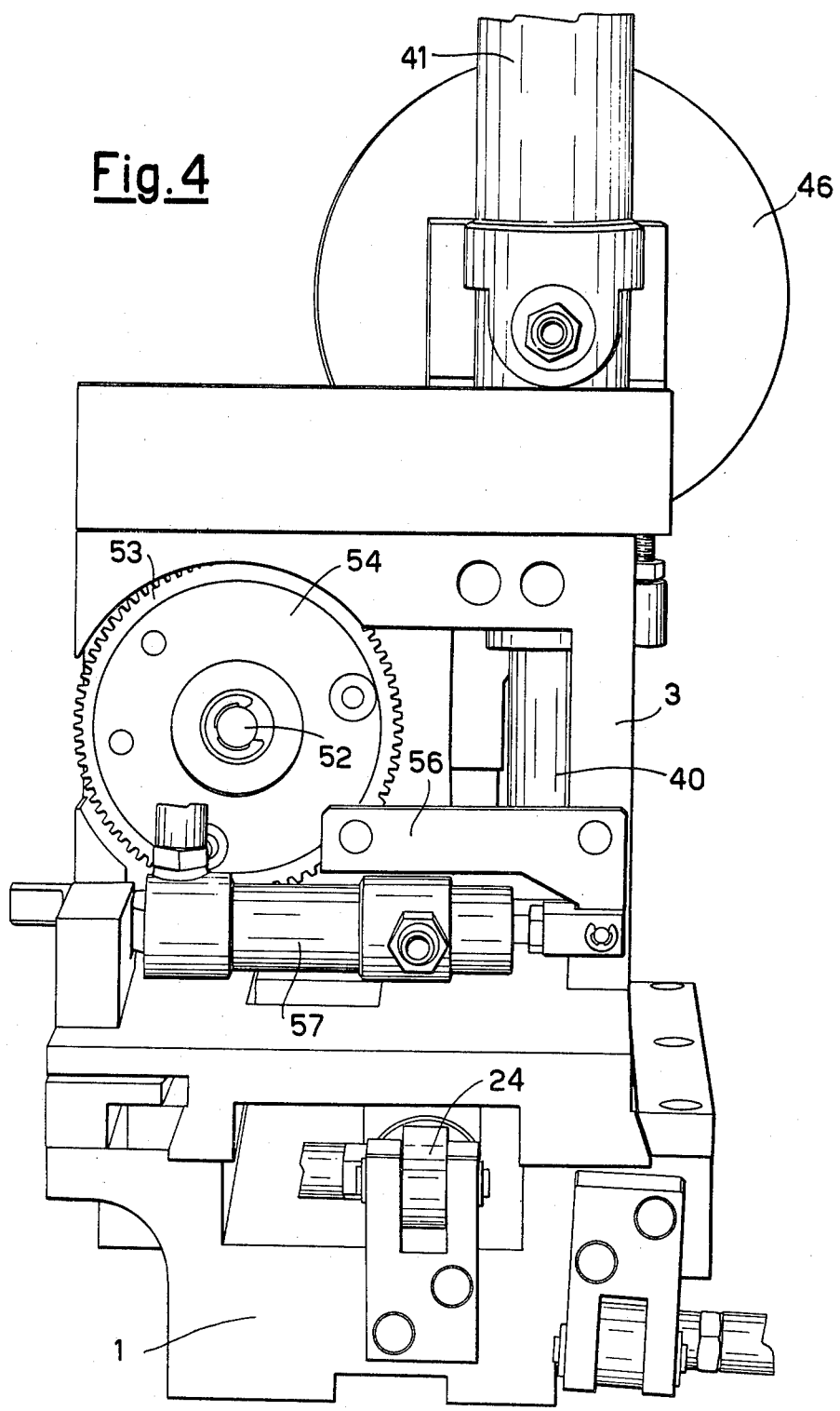
FIG. 4 is a rear view of said machine.
Figure 7:
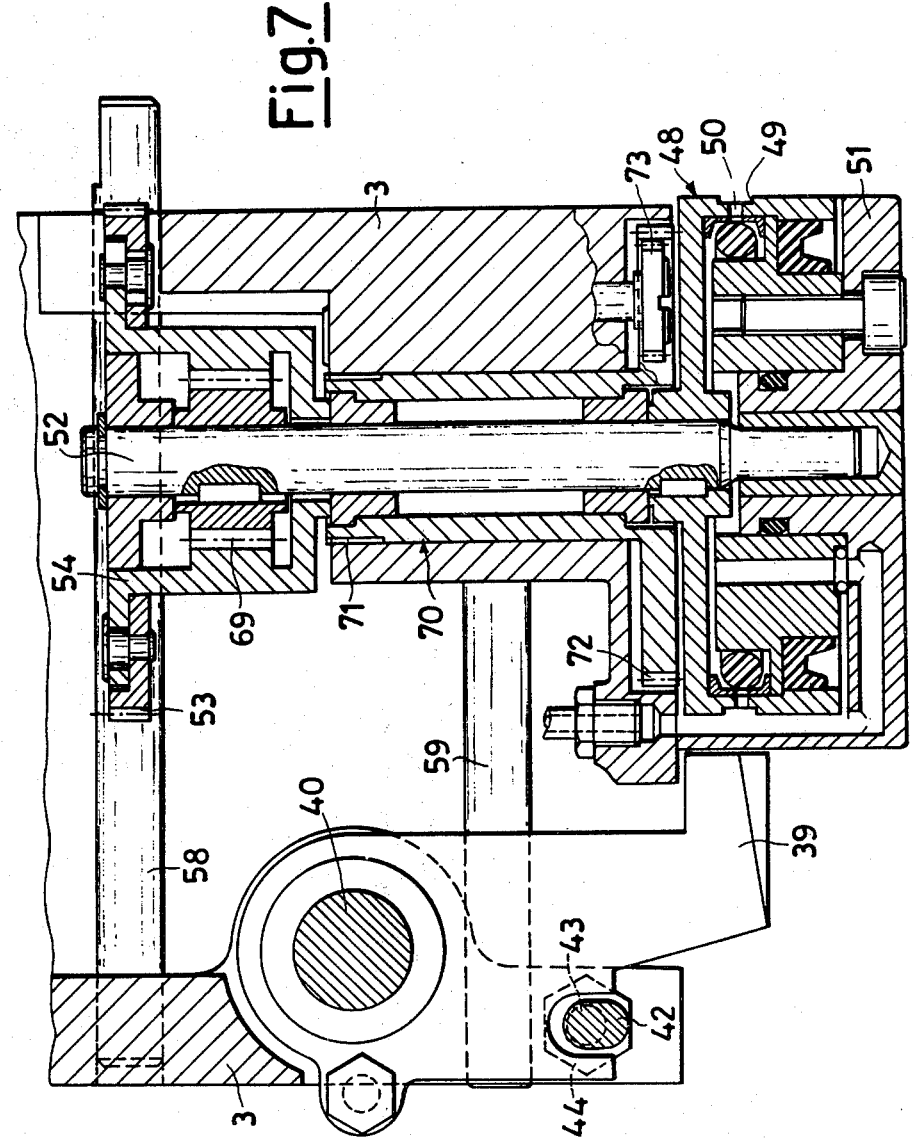
FIG. 7 is a section through said machine on the line VII—VII of FIG. 2.

Small lengths of adhesive tape are fed intermittently to the splicing head 34, which separates them from a continuous band 45 and deposits them on the tapes to be spliced, which are housed in the grooves 5 and 8, 9 of the plates 4 and 7 in the manner explained hereinafter. The band of adhesive tape 45 unwinds from a continuous roll wound about a drum 46 mounted idly on a pin 47 carried by the member 3, the non-adhesive face of the adhesive tape also wrapping a part (about 180°) of a wheel 48 provided with a guide groove 49 with bores 50 connected to an air suction source. The grooved wheel 48, protected at its front by a fixed bracket 51 (FIGS. 1 to 3, 7), is fixed on a rotatable pin 52, which a unidirectional clutch 69 (FIG. 7) connects for rotation to a cylinder with an annular flange 54 which is itself fixed with a small degree of angular slack to a gear wheel 53 (FIGS. 4 and 7). With this latter there is engaged a rack 55, carried rigidly by a carriage 56 which can move transversely to the axes of the pins 52 and 40 under the control of a pneumatic cylinder 57 and guided by two fixed bars 58 and 59. As shown in FIG. 7, the pin 52 is supported freely rotatable by an axially mobile cylindrical support 70, which is screw-engaged with the member 3 at its rear end 71 and comprises at its front end a gear 72 engaged with a pinion 73 rotatably supported by the member 3 and operable manually from the front of the machine by way of a screwdriver slot 74 which can be seen in FIGS. 1 to 3. This makes it possible to adjust the axial position of the grooved wheel 48 by rotating the pinion 73.

Figure 6:
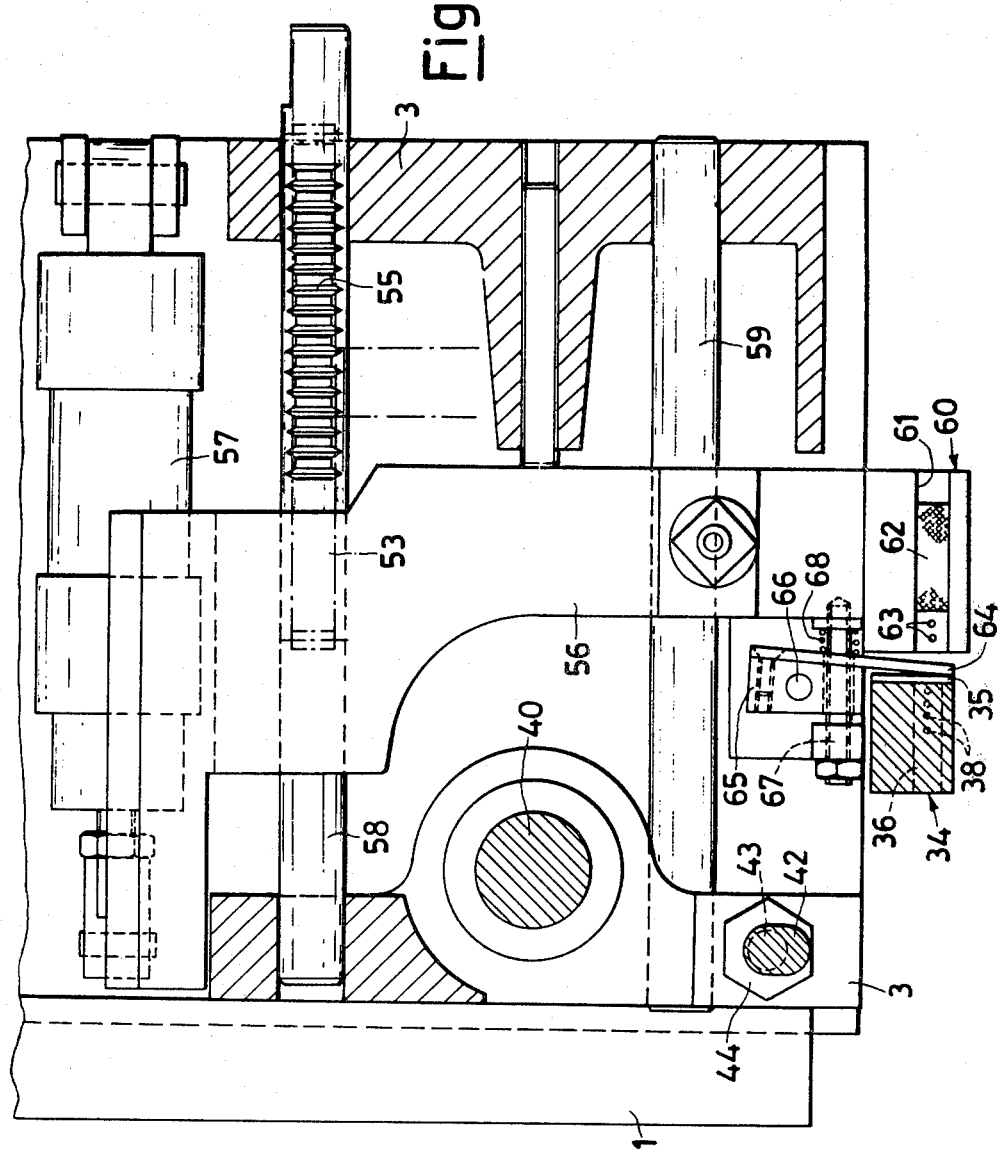
FIG. 6 is a section through said machine on the line VI—VI of FIG. 1.

With regard to the carriage 56, it can be seen in FIG. 6 that this also carries a mobile block 60, which can be moved horizontally from the position of FIG. 1 (under the grooved wheel 48) to the position of FIG. 2 (under the head 34), and is intended to support and guide the adhesive tape 45 on its adhesive face side over the length lying between the grooved wheel 48 and head 31. For this purpose, the mobile block 60 comprises a guide groove 61 provided with a knurled portion 62 and bores 63 which can be connected either to a suction source or an air supply. A backing blade 64 is associated with the block 60 at that edge which faces the splicing head 34, and is designed to cooperate with the cutting appendix 35 of the head, and is brought into a normally oblique and downwardly inclined position (FIG. 6) by a support 65 pivoted at 66 to the carriage 56 and mobile along the axis of a screw 67 against the force of a spring 68.

In the manner described hereinafter, the machine shown on the drawings is able to load a portion of magnetic tape into a recording cassette previously provided with neutral or connection tape which unwinds from one to the other of the two spools situated inside the cassette. When the mobile plate 7 is in a position such that the grooves 5 and 9 of the two plates 4 and 7 are aligned, the connection tape is partly extracted from the cassette in known manner independent of the characteristics of the present invention, and disposed so that it straddles the two plates 4 and 7, said tape being retained in the two aligned grooves 5 and 9 by the suction acting through the bores 6 and 11. The cutting device is then operated by operating the pneumatic cylinder 24, so that it separates the connection tape into two parts by the scissor element 16, which is moved forward in the space 19 together with the slidable support 22 and then rotated by the relative motion between the plate 21 and support 22 caused by the engagement between the pins 26 and 27, one part of the connection tape being left in the groove 5 of the plate 4 and the other part in the groove 9 of the plate 7. This latter is then moved by the cylinder 12 into the position shown in FIGS. 1, 8 and 9, and an initial portion of magnetic tape has either already been fed or is now fed into the groove 8 of the plate 7, now aligned with the groove 5 of the plate 4, until it makes contact with the cut end of that part of the connection tape which has remained in the groove 5 of the plate 4, this magnetic tape then being retained there by suction through the bores 10.

The splicing assembly now begins to operate, its rest position being that shown in FIG. 1, with the adhesive tape 45 partly wrapping the grooved wheel 48 and terminating in engagement with the support and guide element 60, which has stopped in proximity to the exit of the wheel 48. Both the bores 50 of the wheel 48 and the bores 63 of the element 60 are under suction, and retain the respective lengths of adhesive tape in the corresponding grooves 49 and 68. On operating the pneumatic cylinder 57, the support and guide element 60 begins to move towards the head 34, and almost simultaneously the grooved wheel 48 begins to rotate clockwise (FIG. 2), this latter wheel in reality being subject to a slight delay due to the already mentioned slack between the gear wheel 53 and disc 54, to obviate any sticking of the adhesive face of the tape 45 to the support and guide element 60. A terminal portion of adhesive tape is thus brought below the splicing head 34 (FIG. 2) and is left there engaged with the rubber layer 37 by simultaneously connecting the bores 48 of the head to a suction source and the bores 63 of the support 60 to an air supply. The support and guide element 60 then returns to the position of FIG. 1 (while the wheel 48 remains at rest), and the cylinder 41 then causes the head 34 to descend, so that its cutting edge 35 firstly slightly moves the backing blade 64 towards the right (with reference to FIG. 2) and then cooperates with it to separate from the remaining continuous band the end portion of adhesive tape which has already been fed and brought into engagement with the head 34. As the head continues to descend (FIG. 3) said end portion of adhesive tape becomes placed over and made to adhere to the two abutting ends of magnetic and connection tape which are located in and project from the aligned grooves 8 and 5, thus carrying out the splicing. The head 34 then rises again, returning to the rest position (FIG. 1).

The magnetic tape is then loaded in known manner, once the bores 6 and 10 of the plates 4 and 7 have been connected to an air supply, by rewinding into the cassette that part of the connection tape which has been joined to the magnetic tape, together with the required length of magnetic tape. This rewinding is subsequently stopped, and the magnetic tape is then cut by the scissor element 16, that part thereof spliced to the already rewound part of the connection tape remaining inserted in the groove 5 of the plate 4, whereas its other part remains inserted in the groove 8 of the plate 7. This latter is then returned to its initial position, so causing that part of the connection tape remaining in the groove 9 to align and abut against said spliced part of the magnetic tape. The splicing assembly is then again made to operate in the manner previously explained, in order to apply a further piece of adhesive tape over the abutting ends of the magnetic and connection tape, and the loading of the magnetic tape and the remaining part of the connection tape into the cassette is then completed.

It should be noted that for correct application of the adhesive splicing tape, it is essential that the head 34 is correctly disposed relative to the housing grooves for the tapes to be spliced. This is attained during the actual setting of the machine by suitably adjusting the position of the block 3 relative to the base 1 in a direction perpendicular to the direction of extension of the grooves 5, 8 and 9 using a screw 75 (FIGS. 1 to 3) and also adjusting the angular position of the head 34 relative to the block 3 by adjusting the angular position of the guide rod 42. The axial position of the grooved wheel 48 can also be adjusted, as described, by means of the pinion 73. Limit stop devices, not described, are also provided for adjusting the starting and arrival positions of the various mobile elements of the machine.

I claim:

1. A tape splicing machine, in particular for magnetic tapes for loading into cassettes, comprising means for intermittently feeding adhesive tape in a continuous roll to an alternately sucking and blowing mobile head provided with cutting means for separating individual pieces of adhesive tape from said continuous roll, wherein said adhesive tape feed means comprise a grooved wheel which is partly wrapped by the adhesive tape with the non-adhesive side of the tape engaging the wheel, and an alternately sucking and blowing mobile support and guide element which is engageable with the adhesive side of the tape to support the portion of adhesive tape situated between the grooved wheel and the head, and is controlled such that it makes periodic movements towards the head in order to convey said portion of adhesive tape into a suitable position below the head for engagement by said head.

2. A splicing machine as claimed in claim 1, wherein said grooved wheel is provided with bores which can be connected to an air suction source.

3. A splicing machine as claimed in claim 1, comprising unidirectional means for synchronously rotating said grooved wheel simultaneously with each forward movement of said support and guide element towards said head.

4. A splicing machine as claimed in claim 3, comprising means for slightly delaying the commencement of rotation of the grooved wheel relative to the commencement of forward movement of said support and guide element.

* * * * *